(12) United States Patent
Zhang (10) Patent No.: US 12,342,372 B2
(45) Date of Patent: Jun. 24, 2025

(54) TIME DOMAIN POSITION DETERMINATION METHOD AND APPARATUS, TERMINAL, COMPUTER-READABLE MEDIUM, AND CHIP

(71) Applicant: GUANGDONG OPPO MOBILE TELECOMMUNICATIONS CORP., LTD., Dongguan (CN)

(72) Inventor: Zhi Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 354 days.

(21) Appl. No.: 17/723,072

(22) Filed: Apr. 18, 2022

(65) Prior Publication Data
US 2022/0240320 A1    Jul. 28, 2022

Related U.S. Application Data

(63) Continuation of application No. PCT/CN2020/120192, filed on Oct. 10, 2020.

(30) Foreign Application Priority Data

Oct. 19, 2019    (CN) .......................... 201910996917.4

(51) Int. Cl.
*H04W 4/00* (2018.01)
*H04L 1/1607* (2023.01)
(Continued)

(52) U.S. Cl.
CPC ....... *H04W 74/0816* (2013.01); *H04L 1/1642* (2013.01); *H04W 56/001* (2013.01); *H04W 72/0446* (2013.01); *H04W 74/0866* (2013.01)

(58) Field of Classification Search
CPC ........... H04W 74/0816; H04W 56/001; H04W 72/0446; H04W 74/0866; H04W 56/0015;
(Continued)

(56) References Cited

U.S. PATENT DOCUMENTS 10,348,641 B2    7/2019  Pack et al.
10,673,605 B2 *  6/2020  Kim ..................... H04L 5/0092
(Continued)

FOREIGN PATENT DOCUMENTS

CN         107466450 A      12/2017
CN         107667565 A      2/2018
(Continued)

OTHER PUBLICATIONS

The Second Office Action from corresponding Chinese Application No. 202210837230.8, dated Dec. 27, 2023. English translation attached.
(Continued)

*Primary Examiner* — Phuongchau Ba Nguyen
(74) *Attorney, Agent, or Firm* — Sheppard, Mullin, Richter & Hampton LLP (57) ABSTRACT

A time domain position determination method includes: obtaining, by a terminal, first indication information and second indication information, the first indication information indicating a starting position of a Fixed Frame Period (FFP), the second indication information indicating a time domain length of the FFP; and determining time domain positions of the FFP based on the starting position of the FFP and the time domain length of the FFP. Embodiments of the present disclosure further disclose a time domain position determination apparatus, a terminal, a computer-readable medium, a chip, and a computer program product.

12 Claims, 4 Drawing Sheets

(51) Int. Cl.
*H04W 56/00* (2009.01)
*H04W 72/0446* (2023.01)
*H04W 74/08* (2009.01)
*H04W 74/0816* (2024.01)

(58) Field of Classification Search
CPC ... H04W 28/04; H04W 72/04; H04W 72/042; H04W 88/08; H04W 28/08; H04W 28/084; H04W 36/22; H04W 72/12; H04L 1/1642; H04L 5/0094; H04L 5/0007; H04B 7/2656; H04B 10/07; H04B 10/079

See application file for complete search history.

(56) References Cited

U.S. PATENT DOCUMENTS

| | | | |
|---|---|---|---|
| 2017/0171840 A1 | 6/2017 | Mukherjee et al. | |
| 2017/0318607 A1* | 11/2017 | Tiirola | H04W 4/10 |
| 2018/0020375 A1* | 1/2018 | Matsumoto | H04W 84/12 |
| 2018/0270166 A1 | 9/2018 | Pack et al. | |
| 2019/0268883 A1 | 8/2019 | Zhang et al. | |
| 2020/0280418 A1* | 9/2020 | Gao | H04W 72/0446 |
| 2020/0396767 A1* | 12/2020 | Talarico | H04W 74/0808 |
| 2020/0404670 A1* | 12/2020 | Hu | H04W 72/53 |
| 2021/0298072 A1* | 9/2021 | Oh | H04W 74/085 |
| 2021/0385863 A1* | 12/2021 | Fan | H04W 74/002 |
| 2022/0240320 A1* | 7/2022 | Zhang | H04W 56/001 |
| 2022/0377683 A1* | 11/2022 | Myung | H04W 74/0816 |
| 2023/0262691 A1* | 8/2023 | Fu | H04W 74/0808 370/329 |
| 2023/0363002 A1* | 11/2023 | Liang | H04W 74/0825 |
| 2023/0413342 A1* | 12/2023 | Guo | H04L 5/0044 |

FOREIGN PATENT DOCUMENTS

| | | |
|---|---|---|
| CN | 107770872 A | 3/2018 |
| CN | 114270729 A | 4/2022 |
| WO | 2016071741 A1 | 5/2016 |
| WO | 2019161795 A1 | 8/2019 |

OTHER PUBLICATIONS

Vivo, "Frame structure for NR-U operation" 3GPP TSG RAN WG1 Meeting #94bis, R1-1810379, Sep. 29, 2018, full text.
The Grant Notice from corresponding Chinese Application No. 202210837230.8, dated Feb. 26, 2024. English translation attached.
Vivo. "Discussion on the channel access procedures", R1-1910204, 3GPP TSG RAN WG1#98bis, Oct. 4, 2019 (Oct. 4, 2019), Section 2.6.
Qualcomm Incorporated. "DL signals and channels for NR-U", R1-1911095, 3GPP TSG RAN WG1#98bis, Oct. 5, 2019 (Oct. 5, 2019), Sections 6-7.
International Search Report and Written Opinion dated Dec. 31, 2020 in International Application No. PCT/CN2020/120192. English translation attached.
The First Office Action from corresponding Chinese Application No. 202210837230.8, dated Aug. 17, 2023. English translation attached.
Sony, "Channel access for NR unlicensed operations" 3GPP TSG RAN WG1 #98bis, R1-1910759, Oct. 14, 2019, section 2.2, p. 1, 4 pages.
Shi Junfeng et al., "Research on Standardization of Key Technologies of 3GPP LAA-LTE Physical Layer", Telecommuications Network Technology, Issue 12, Dec. 15, 2015, full text, 5 pages.
Communication pursuant to Article 94(3) EPC for European Application 20876266.6 mailed Aug. 8, 2023.
Extended European Search Report dated Oct. 26, 2022 received in European Patent Application No. EP 20876266.6.
Sony: "Channel access for NR unlicensed Operations", 3GPP Draft; RI-1910759-Channel_Access , 3rd Generation Partnership Project (3GPP) ,Mobile Competence Centre ; 650 , Route Des Lucioles ; F-06921 Sophia-Antipolis Cedex; France vol. RAN WG1 , No. Chongqing, China; Oct. 14, 2019-Oct. 20, 2019 Oct. 7, 2019 (Oct. 7, 2019) ,XP051808960.

* cited by examiner

FIG. 1

```
Obtaining, by a terminal, first indication information and
second indication information, wherein the first indication
information indicates a starting position of a Fixed Frame
Period (FFP), and the second indication information indicates a
time domain length of the FFP
```
— S201

```
Determining, by the terminal, time domain positions of the FFP
based on the starting position of the FFP and the time domain
length of the FFP
```
— S203

FIG. 2

```
Obtaining, by a terminal, first indication information and
second indication information, wherein the first indication
information indicates a starting position of an FFP, and the
second indication information indicates a time domain length
of the FFP
```
— S301

```
Obtaining, by the terminal, a reference position, and
determining a specific offset based on the reference position
and the starting position of the FFP
```
— S303

```
Determining, by the terminal, the time domain positions of the
FFP based on the specific offset, the time domain length of the
FFP, and the reference position
```
— S305

Obtaining, by a terminal, third indication information, wherein the third indication information indicates an idle period — S801

Determining, by the terminal within time domain positions of an FFP, positions corresponding to the idle period as idle time domain positions — S803

TIME DOMAIN POSITION DETERMINATION METHOD AND APPARATUS, TERMINAL, COMPUTER-READABLE MEDIUM, AND CHIP

CROSS-REFERENCE TO RELATED APPLICATIONS

The present application is a continuation of the International Application No. PCT/CN2020/120192 filed on Oct. 10, 2020, which is filed based on and claims a priority to Chinese Patent Application No. 201910996917.4, filed on Oct. 19, 2019, the contents of which are incorporated herein by reference in their entirety.

TECHNICAL FIELD

The present disclosure relates to, but is not limited to, the field of communication system technologies, and more particularly, to a time domain position determination method and apparatus, a terminal, a computer-readable medium, and a chip.

BACKGROUND

An unlicensed frequency spectrum is a shared spectrum. Communication devices in different communication systems can use the spectrum without applying for proprietary spectrum authorization from the authority, as long as they meet regulatory requirements set by a country or region on the spectrum.

It is a problem having been studied long in the field how a terminal determines and thus listens to time domain positions of a Fixed Frame Period (FFP) so as to determine, based on a listening result, whether to use an unlicensed frequency spectrum.

SUMMARY

Embodiments of the present disclosure provide a time domain position determination method and apparatus, a terminal, a computer-readable medium, and a chip.

In a first aspect, a time domain position determination method is provided. The method includes: obtaining, by a terminal, first indication information and second indication information. The first indication information indicates a starting position of an FFP, and the second indication information indicates a time domain length of the FFP. The method further includes: determining time domain positions of the FFP based on the starting position of the FFP and the time domain length of the FFP.

In a second aspect, a time domain position determination method is provided. The method includes: obtaining, by a terminal, third indication information. The third indication information indicates an idle period. The method further includes: determining, within time domain positions of an FFP, positions corresponding to the idle period as idle time domain positions.

In a third aspect, a time domain position determination apparatus is provided. The apparatus includes an obtaining unit and a determining unit. The obtaining unit is configured to obtain, by a terminal, first indication information and second indication information. The first indication information indicates a starting position of an FFP, and the second indication information indicates a time domain length of the FFP. The determining unit is configured to determine time domain positions of the FFP based on the starting position of the FFP and the time domain length of the FFP.

In a fourth aspect, a time domain position determination apparatus is provided. The apparatus includes an obtaining unit and a determining unit. The obtaining unit is configured to obtain, by a terminal, third indication information. The third indication information indicates an idle period. The determining unit is configured to determine, within time domain positions of an FFP, positions corresponding to the idle period as idle time domain positions.

In a fifth aspect, a terminal is provided. The terminal includes a memory storing instructions, and a processor communicatively coupled with the memory. The instructions, when executed by the processor, cause the terminal to perform the time domain position determination method as described in any one of the above aspects.

In a sixth aspect, a computer-readable medium having instructions stored thereon is provided. The instructions are executed by one or more processors of a terminal to perform the time domain position determination method as described in any one of the above aspects.

In a seventh aspect, a chip is provided. The chip includes a processor configured to invoke and run a computer program from a memory, thereby causing an apparatus provided with the chip to perform the time domain position determination method as described in any one of the above aspects.

In an eighth aspect, a computer program product is provided. The computer program product includes a computer storage medium. The computer storage medium stores computer program codes. The computer program codes include instructions executable by at least one processor. The instructions, when executed by the at least one processor, perform the time domain position determination method as described in any one of the above aspects.

In the embodiments of the present disclosure, the terminal obtains the first indication information and the second indication information. The first indication information indicates the starting position of the FFP, and the second indication information indicates the time domain length of the FFP. The time domain positions of the FFP are determined based on the starting position of the FFP and the time domain length of the FFP. In this way, the terminal can determine the time domain positions of the FFP based on the starting position of the FFP and the time domain length of the FFP, thus providing a way to determine the time domain positions of the FFP.

It should be understood that the above general description and the following detailed description are exemplary and illustrative only, and do not limit the present disclosure.

DESCRIPTION OF EMBODIMENTS

Technical solutions of the present disclosure will be described in detail below in combination with embodiments and accompanying drawings. The following specific embodiments can be combined with each other, and the same or similar concepts or procedures may be omitted in some embodiments.

It should be noted that in the examples of the present disclosure, expressions such as "first" and "second" are used to distinguish similar objects, rather than to describe a specific sequence or order.

In addition, the technical solutions described in the embodiments of the present disclosure can be combined arbitrarily without mutual contradiction.

Exemplary embodiments will be described in detail below, examples of which are illustrated in the accompanying drawings. The following description will be made with reference to accompanying drawings, throughout which the same reference numerals in different figures represent the same or similar elements unless otherwise specified. Implementations described in the following description of the exemplary embodiments do not represent all implementations of the present disclosure. On the contrary, the implementations are merely examples of apparatuses and methods consistent with aspects related to the present disclosure and described in the claims as attached.

In order to allow various communication systems that use an unlicensed frequency spectrum for wireless communication to coexist friendly on the unlicensed frequency spectrum, some countries or regions have stipulated regulatory requirements that must be met when using the unlicensed frequency spectrum. For example, a communication device follows the "Listen Before Talk (LBT)" principle. That is, the communication device needs to perform channel listening before transmitting signals on a channel of the unlicensed frequency spectrum. Only when a result of the channel listening indicates that the channel is idle, the communication device can transmit a signal on the channel. When the result of the channel listening performed by the communication device on the channel of the unlicensed frequency spectrum indicates that the channel is busy, the communication device cannot transmit any signal on the channel. In order to ensure fairness, in one transmission, a time duration when the communication device uses the channel of the unlicensed frequency spectrum for signal transmission cannot exceed a Maximum Channel Occupancy Time (MCOT).

Generally, a station monitors whether the unlicensed frequency spectrum is idle before transmitting a signal. For example, the station determines whether the unlicensed frequency spectrum is idle or busy based on a received power on the unlicensed frequency spectrum. When the received power is smaller than a certain threshold, the unlicensed frequency spectrum is considered to be in an idle state, and thus the signal can be transmitted on the unlicensed frequency spectrum; otherwise no signal is transmitted. The introduction of the LBT avoids a conflict that occurs when stations use an unlicensed frequency spectrum resource.

On an unlicensed carrier, for the COT obtained by a base station, the base station can share the COT with a terminal for transmitting uplink signals or uplink channels. That is, the UE can use an LBT manner with a higher priority when the base station shares the COT obtained by itself with a User Equipment (UE) than when the UE itself tries to obtain a channel, such that the UE may be more likely to obtain the right to use the channel.

In the unlicensed frequency spectrum, there is a Frame Based Equipment (FBE) access mode. In this mode, it is still an unsolved problem how the base station informs the UE for the UE to determine positions of an FBE Frame Period (FFP) and COT positions and idle positions in the FFP.

Figure 1:
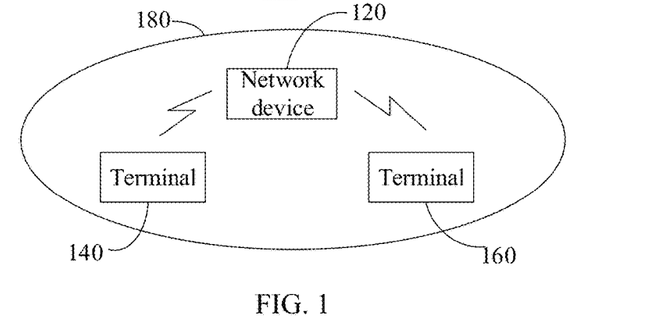
FIG. 1 illustrates an exemplary wireless communication system according to some embodiments of the present disclosure.

FIG. 1 illustrates an exemplary wireless communication system according to an embodiment of the present disclosure.

A wireless communication system 100 includes a network device 120, a terminal 140, and a terminal 160.

The network device 120 may be an end node of a wireless communication network. For example, the network device 120 may be an Evolved Node B (eNB) in a Long Term Evolution (LTE) system or a next generation Node B (gNB) in a 5th-Generation (5G) radio system. The network device 120 transmits radio signals carrying system information of the wireless communication system. The terminal 140 and the terminal 160 that are located within a coverage region 180 of the network device 120 receive the system information. For example, the terminal 140 located within the coverage region 180 receives the system information, and can access a network service via the network device 120.

Each of the terminal 140 and the terminal 160 is a mobile terminal in the wireless communication network. For example, the terminal 140 or the terminal 160 may be a smart phone, a network interface card, or a machine-type terminal. For another example, the terminal 140 or the terminal 160 may be a terminal in the LTE system or the 5G radio system. The terminal 140 and the terminal 160 as well as the network device 120 may each include a communication unit that can transmit and receive radio signals. The following description discusses operating the terminal 140 in the wireless communication system, and it should be understood that such description is also applicable to the terminal 160.

The terminal in the embodiments of the present disclosure may also refer to a terminal device, an access terminal device, a user unit, a user station, a mobile station, a mobile platform, a remote station, a remote terminal device, a mobile device, a UE, a wireless communication device, a user agent, or a user device. The terminal device may be a server, a mobile phone, a tablet, a laptop, a handheld computer, a personal digital assistant, a portable media player, a smart speaker, a navigation device, a display device, a wearable device such as a smart bracelet, a Virtual Reality (VR) device, an Augmented Reality (AR) device, a pedometer, a digital television (TV), or a desktop computer.

The network device in the embodiments of the present disclosure may be a network side device that performs wireless communication with the terminal device, e.g., a Wireless-Fidelity (Wi-Fi) access point, or a small station, a micro station or a Transmission reception point (TRP) in 5G. Alternatively, the network device may be a relay station, an access point, a vehicle-mounted device, a wearable device, or the like.

Figure 2:
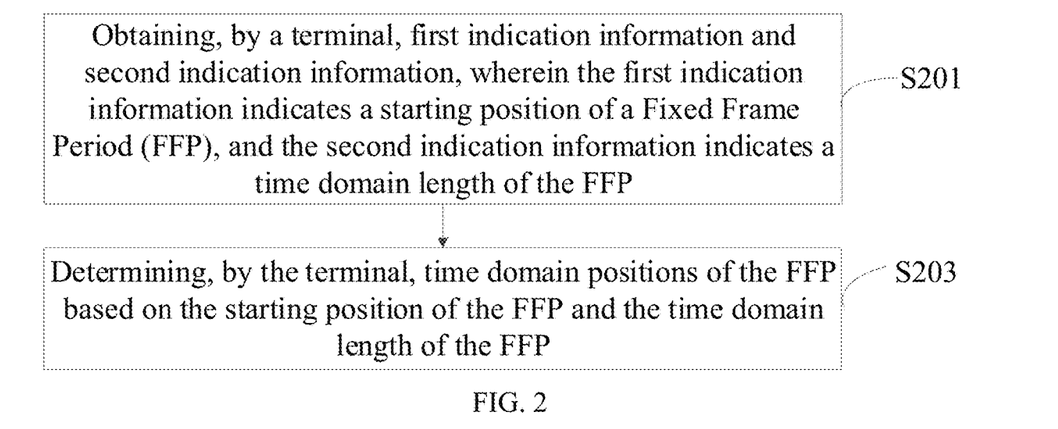
FIG. 2 is a schematic flowchart illustrating a time domain position determination method according to an embodiment of the present disclosure.

FIG. 2 is a schematic flowchart illustrating a time domain position determination method according to an embodiment of the present disclosure. As illustrated in FIG. 2, the time domain position determination method is applied in a terminal, and includes the following operations.

At block S201, the terminal obtains first indication information and second indication information. The first indication information indicates a starting position of an FFP, and the second indication information indicates a time domain length of the FFP.

In some implementations, the Fixed Frame Period (FFP) may be construed as an FBE Frame Period (FFP). The time domain length of the FFP can be referred to as a period length of the FFP.

In some implementations, the terminal may receive the first indication information and the second indication information transmitted by a network device, so as to obtain the first indication information and the second indication information. In other implementations, the terminal may receive an operation of a user on the terminal device, generate an operation instruction, and obtain the first indication information and the second indication information based on the operation instruction. In still other implementations, the terminal may obtain the first indication information and the second indication information from a storage medium inside the terminal.

The embodiments of the present disclosure do not limit a sequence of obtaining the first indication information and the second indication information. For example, the first indication information and the second indication information may be indicated on a same time domain symbol in a same subframe. That is, the first indication information and the second indication information may be obtained simultaneously. For another example, the first indication information and the second indication information may be on different subframes, or may be on different symbols in a same subframe.

The symbol in the embodiments of the present disclosure may be an Orthogonal Frequency Division Multiplexing (OFDM) symbol.

The FFP may include a COT and an idle period. The idle period can be at least 5% of the COT. The COT may also be referred to as a channel occupancy period in other embodiments, and the idle period may also be referred to as an idle cycle, an idle duration, an idle time, or the like in other embodiments. The COT provides a maximum scheduling time per FFP. The idle period may be at an end or other positions of the FFP.

The first indication information may indicate or include the starting position of the FFP, and the second indication information may indicate or include the time domain length of the FFP.

The starting position of the FFP can be a starting position in a time domain. For example, in some implementations, the starting position of the FFP may be a starting position of a certain radio frame. In other implementations, the starting position of the FFP may be a starting position of one of subframes in a certain radio frame. In still other implementations, the starting position of the FFP may be obtained by offsetting a starting position of a certain radio frame. For example, the starting position of the FFP may be obtained by offsetting a starting position of a certain radio frame by a specific number of symbols, slots, or subframes.

The time domain length of the FFP may be an integer multiple of a length of a radio frame. For example, in an implementation, the time domain length of the FFP is 3 times the length of the radio frame. In other implementations, the time domain length of the FFP may be 1 time, 2 times, 4 times, 5 times, etc., the length of the radio frame. In yet other implementations, the time domain length of the FFP may be a fractional multiple of the length of the radio frame. For example, the time domain length of the FFP may be 1.5 times, 2.5 times, 3.5 times, 4.5 times, etc., the length of the radio frame. The embodiments of the present disclosure do not limit the time domain length of the FFP.

At block 203, the terminal determines time domain positions of the FFP based on the starting position of the FFP and the time domain length of the FFP.

In the present disclosure, the time domain positions of the FFP may be, e.g., time domain positions, a time domain length or a time domain period, occupied by the FFP.

In the implementations of the present disclosure, the time domain positions of the FFP may be consecutive in the time domain. For example, an ending position of time domain positions of a certain FFP may be a starting position of time domain positions of an FFP following the certain FFP. The terminal may determine time domain positions of a q-th FFP based on a starting position of the q-th FFP and a time domain length of the q-th FFP. In other embodiments, the time domain positions of the FFP may not be consecutive in the time domain.

In the embodiments of the present disclosure, the terminal obtains the first indication information and the second indication information, the first indication information indicating the starting position of the FFP, the second indication information indicating the time domain length of the FFP; and determines the time domain positions of the FFP based on the starting position of the FFP and the time domain length of the FFP. In this way, the terminal can determine the time domain positions of the FFP based on the starting position of the FFP and the time domain length of the FFP, thus providing a way to determine the time domain positions of the FFP.

It should be noted that when the terminal listens to a channel based on the time domain positions of the FFP, the terminal can use the unlicensed frequency spectrum for communication when a result of channel listening indicates that the channel is idle, and the terminal cannot use the unlicensed frequency spectrum for communication when the result of channel listening indicates that the channel is busy.

On a basis of the time domain position determination method according to the embodiment corresponding to FIG.

2, an embodiment of the present disclosure may further provide a time domain position determination method. The method is applied in the terminal.

In some implementations, obtaining, by the terminal, the first indication information and the second indication information may include receiving, by the terminal, first information transmitted by a network device. The first information includes the first indication information and the second indication information.

In such implementations, the first information includes the first indication information and the second indication information, such that the terminal can obtain the starting position of the FFP and the time domain length of the FFP based on the received first information. In this way, the network device only needs to give indication through one piece of information, which can reduce signaling consumption of the network device and the terminal.

In other implementations, obtaining, by the terminal, the first indication information and the second indication information may include: receiving, by the terminal, second information transmitted by the network device, the second information including the first indication information; receiving, by the terminal, third information transmitted by the network device, the third information including the second indication information.

In such implementations, the first indication information is included in the second information, and the second indication information is included in the third information. In this way, the starting position of the FFP and the time domain length of the FFP can be indicated separately, such that the starting position of the FFP and/or the time domain length of the FFP can be applied in confirmation or calculation of other information.

In an implementation of the present disclosure, the first information, the second information, or the third information may be configuration information, or any information transmitted by the network device to the terminal.

In some embodiments, determining, by the terminal, the time domain positions of the FFP based on the starting position of the FFP and the time domain length of the FFP may include: determining, by the terminal, a first product of (q−1) and the time domain length of the FFP, where q is an integer greater than or equal to 1; determining, by the terminal, a first sum value of the starting position of the FFP and the first product; determining, by the terminal, a second product of q and the time domain length of the FFP; determining, by the terminal, a second sum value of the starting position of the FFP and the second product; and determining, by the terminal, positions between the first sum value and the second sum value in a time domain as time domain positions of a q-th FFP.

The terminal may determine that the starting position of the time domain positions of the q-th FFP may be $T+(q−1)×P$, and the ending position of the time domain positions of the q-th FFP may be $T+q×P$. Here, T represents the starting position of the FFP, P represents the time domain length of the FFP, and q is a positive integer, e.g., 1, 2, 3, 4 and so on. Therefore, the terminal can determine that positions between $T+(q−1)×P$ and $T+q×P$ are the time domain positions of the FFP.

In the embodiments of the present disclosure, at least one way to determine the time domain positions of the FFP is provided, such that the time domain positions of the FFP can be determined in a simple manner.

On a basis of the above embodiments, two methods for determining the time domain positions of the FFP based on the starting position of the FFP and the time domain length of the FFP will be described below.

Method 1

An embodiment of the present disclosure may further provide a time domain position determination method, which is applied in the terminal. Here, the starting position of the FFP includes a specific offset relative to a reference position.

Determining the time domain positions of the FFP based on the starting position of the FFP and the time domain length of the FFP may include obtaining the reference position, and determining the time domain positions of the FFP based on the specific offset, the time domain length of the FFP, and the reference position.

The reference position in the embodiments of the present disclosure may be referred to as a reference point position. In some implementations, the reference position may be configured by the terminal itself, or the reference position may be indicated by the network device. In some implementations, the starting position of the FFP can be obtained by adding the specific offset to or subtracting the specific offset from the reference position. In some embodiments, a result of an add operation or a subtraction operation on the starting position of the FFP and the reference position is determined as the specific offset. In short, any one of the starting position of the FFP, the reference position, and the specific offset can be calculated or determined based on the remaining two of the starting position of the FFP, the reference position, and the specific offset.

Method 2

Figure 3:
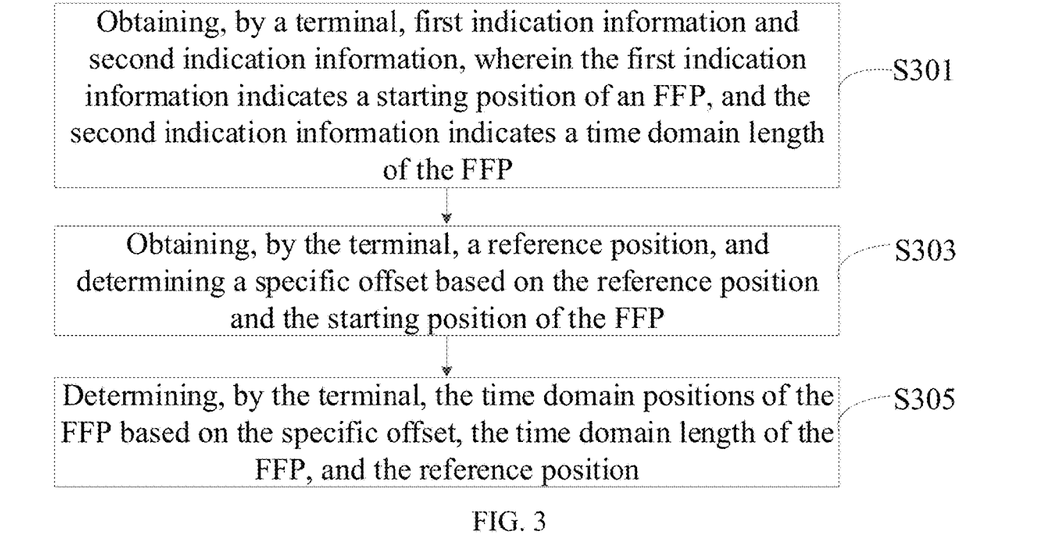
FIG. 3 is a schematic flowchart illustrating a time domain position determination method according to another embodiment of the present disclosure.

FIG. 3 is a schematic flowchart illustrating a time domain position determination method according to another embodiment of the present disclosure. As illustrated in FIG. 3, the time domain position determination method is applied in the terminal, and may include the following operations.

At block 301, the terminal obtains first indication information and second indication information. The first indication information indicates a starting position of an FFP, and the second indication information indicates a time domain length of the FFP.

At block S303, the terminal obtains a reference position, and determines a specific offset based on the reference position and the starting position of the FFP.

In some implementations, the terminal may determine the reference position based on its own configuration. In other implementations, the terminal may obtain the reference position based on third indication information it obtains. The third indication information may be included in the first information, the second information or the third information as described above, or the third indication information may be included in fourth information that is different from the first information, the second information, and the third information. The fourth information may be the configuration information, or any information transmitted by the network device to the terminal.

The reference position may be configured by the terminal itself or indicated by the network device. In some embodiments, the reference position may be a starting position of a System Frame Number (SFN) with an index of a specific value, or the reference position may be a starting position of an SFN with an index of a specific value indicated by the network device. Here, the specific value is an integer greater than or equal to 0. In some embodiments, the reference position is a starting point of an SFN with an index 0, or a starting point of an SFN with any index indicated by a base station. In the embodiments of the present disclosure, the specific value may be any integer greater than or equal to 0, and a magnitude of the specific value may be related to the time domain length of the FFP.

For example, the reference position may be a starting position of an SFN with an index 0 (SFN0), a starting position of an SFN with an index 1 (SFN1), a starting position of an SFN with an index 2 (SFN2), or the like.

In other implementations, the reference position may be another position. For example, instead of being the starting position of the SFN, the reference position may be a position obtained by offsetting the starting position of the SFN by a certain value in the time domain. The embodiments of the present disclosure do not specifically limit the reference position.

At block S305, the terminal determines the time domain positions of the FFP based on the specific offset, the time domain length of the FFP, and the reference position.

In some embodiments, determining, by the terminal, the time domain positions of the FFP based on the specific offset, the time domain length of the FFP, and the reference position may include: determining, by the terminal, a first product of (q−1) and the time domain length of the FFP, where q is an integer greater than or equal to 1; determining, by the terminal, a third sum value of the reference position, the specific offset, and the first product; determining, by the terminal, a second product of q and the time domain length of the FFP; determining, by the terminal, a fourth sum value of the reference position, the specific offset, and the second product; and determining, by the terminal, positions between the third sum value and the fourth sum value in a time domain as time domain positions of a q-th FFP.

The terminal may determine that the starting position of the time domain positions of the q-th FFP may be T0+O+(q−1)×P, and the ending position of the time domain positions of the q-th FFP may be T0+O+q×P. Here, q is a positive integer, T0 represents the reference position, O represents the specific offset in the first indication information, and P represents the time domain length of the FFP in the second indication information. Therefore, the terminal can determine that positions between O+(q−1)×P and O+q×P are the time domain positions of the FFP.

For example, a 1-st FFP starts from a starting point T0+O and ends at T0+O+P, a 2-nd FFP starts from T0+O+P and ends at T0+O+2×P, a 3-rd FFP starts from T0+O+2×P and ends at T0+O+3×P, and so on.

A way to determine the starting position of the FFP in the embodiments of the present disclosure will be described below.

In some embodiments, the starting position of the FFP may be determined by offsetting a specific offset (Offset or O) from the reference position in the time domain. That is, the first indication information is an offset relative to the reference position.

The specific offset can be determined based on actual conditions. For example, the specific offset can be determined based on a channel environment, and/or a communication distance between the terminal and the network device, and/or a load condition of the network device, and/or a processing speed of the network device or the terminal.

In some implementations, the specific offset may be obtained by multiplying a first interval by a first value, and the first value is an integer greater than or equal to 0.

For example, the specific offset may be a product of the first interval and the first value. For another example, the specific offset may be determined by performing a certain mathematical operation on the product of the first interval and the first value and another value.

In other implementations, the specific offset is obtained by dividing the first interval by a second value, and the second value is an integer greater than or equal to 1.

For example, the specific offset may be a result of dividing the first interval by the second value. For another example, the specific offset may be determined by performing a certain mathematical operation on the result of dividing the first interval by the second value and another value.

The specific offset may be a multiple of the first interval, or may be a fraction of the first interval. That is, a relation between the specific offset and the first interval satisfies: Offset=n×T, or Offset=T/m. Here, Offset represents the specific offset, T represents the first interval, n is a positive integer or 0, and m is a positive integer.

In some embodiments, the first interval may include one of a time domain interval corresponding to an SFN, a time domain interval corresponding to a 15 khz subcarrier, a time domain interval corresponding to a 30 khz subcarrier, a time domain interval corresponding to a 60 khz subcarrier, a time domain interval corresponding to a 120 khz subcarrier, a time domain interval corresponding to a 240 khz subcarrier, and a time domain interval corresponding to a Synchronization Signal and physical broadcast channel Block (SSB).

The time domain interval corresponding to the SFN can be 10 milliseconds (ms), the time domain interval corresponding to the 15 khz subcarrier can be 1 ms, the time domain interval corresponding to the 30 khz subcarrier can be 0.5 ms, the time domain interval corresponding to the 60 khz subcarrier can be 0.25 ms, the time domain interval corresponding to the 120 khz subcarrier can be 0.125 ms, the time domain interval corresponding to the 240 khz subcarrier can be 0.0625 ms, and the time domain interval corresponding to the SSB can be a Dedicated Reference Signal (DRS) window length for SSB transmission. Here, a configurable length of the window can be 1 ms, 2 ms, 3 ms, 4 ms, and 5 ms. The DRS may be any reference signal in the network, including a sounding reference signal, a demodulation reference signal, a cell reference signal, or the like. Here, the corresponding time domain interval can be understood as an interval, an interval of a slot, or the like.

In some embodiments, the first interval may be obtained based on an explicit indication, an implicit indication, or a configuration indication by a network device, or the first interval may be a first fixed value.

The first interval can be obtained from the configuration indication by the network device. The explicit indication by the network device may be performed in a manner where the network device can directly transmit a specific value of the first interval to the terminal. The implicit indication by the network device may be performed in a manner where, instead of directly transmitting the first interval to the terminal, the network device transmits some parameters to the terminal and the terminal may calculate the first interval based on these parameters.

A way to determine the time domain length of the FFP in the embodiments of the present disclosure will be described below.

In some implementations, the time domain length of the FFP is determined based on a product of a third value and a second interval. The third value is an integer greater than or equal to 1.

For example, the time domain length of the FFP may be the product of the third value and the second interval. For another example, the time domain length of the FFP can be determined by performing a certain mathematical operation on the product of the third value and the second interval and another value.

In some embodiments, the time domain length of the FFP obtained based on the second indication information may be a multiple of a second interval L. That is, a relation between a period length of the FFP and the second interval satisfies P=m×L. Here, P represents the time domain length of the FFP, L represents the second interval, and m is a positive integer.

In some embodiments, the second interval may include one of a time interval corresponding to an SFN (i.e., 10 ms), a time interval corresponding to a 15 khz subcarrier (i.e., 1 ms), a time interval corresponding to a 30 khz subcarrier (i.e., 0.5 ms), a time interval corresponding to a 60 khz subcarrier (i.e., 0.25 ms), a time interval corresponding to a 120 khz subcarrier (i.e., 0.125 ms), a time interval corresponding to a 240 khz subcarrier (i.e., 0.0625 ms), and a configuration periodicity (which can be downlink(dl)-UpLink(UL)-TransmissionPeriodicity). In some embodiments, the configuration periodicity may be replaced by a system Time Division Duplex (TDD) UL/DL frame construction indication periodicity.

In some embodiments, the second interval may be obtained based on an explicit indication or a configuration indication by the network device, or obtained through an implicit indication (e.g., through a dl-UL-TransmissionPeriodicity indication); or the second interval may be a second fixed value.

In the embodiments of the present disclosure, the terminal determines the time domain positions of the FFP also based on the reference position, such that the obtained time domain positions of the FFP can be more accurate.

Implementations of the time domain position determination method will be described below with reference to FIGS. 4 to 7. It should be noted that the implementations are based on the time domain position determination method provided by the present disclosure and can be applied in 5G New Radio (NR) non-licensed band communication.

Figure 4:
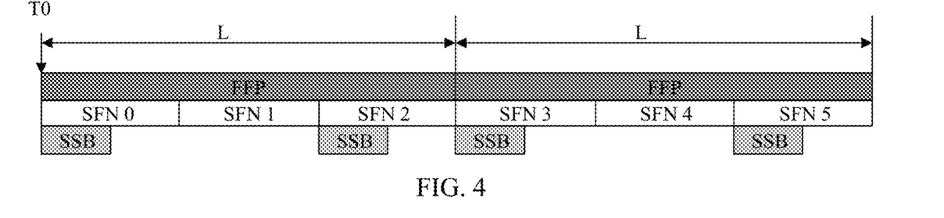
FIG. 4 is a schematic diagram showing time domain positions of an FFP according to an embodiment of the present disclosure.

FIG. 4 is a schematic diagram showing time domain positions of an FFP according to an embodiment of the present disclosure. As illustrated in FIG. 4, a starting point of T0=SFN0 is the starting position of the FFP, the specific offset O indicated by the first indication information is 0, and the time domain length of the FFP indicated by the second indication information is three times an SFN length. For example, when the SFN length is 10 ms, the time domain length of the FFP is L=3×10 ms. The terminal may determine that time domain positions of the 1-st FFP start from a starting point of SFN0 and end at an ending point of SFN2, time domain positions of the 2-nd FFP start from a starting point of SFN3 and end at an ending point of SFN5, and so on. FIG. 4 also illustrates positions of SSBs relative to SFNs.

Figure 5:
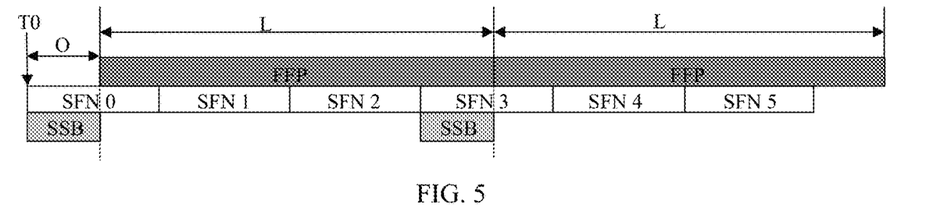
FIG. 5 is a schematic diagram showing time domain positions of another FFP according to an embodiment of the present disclosure.

FIG. 5 is a schematic diagram showing time domain positions of another FFP according to an embodiment of the present disclosure. As illustrated in FIG. 5, the starting point of T0=SFN0 is the reference position of the FFP, the specific offset O indicated by the first indication information is one multiplied by the DRS window length for SSB transmission, and the second indication information indicates that the time domain length of the FFP is three times the SFN length. For example, when the SFN length is 10 ms, the time domain length of the FFP is L=3×10 ms. The terminal can determine that the time domain positions of the 1-st FFP start from a point obtained by adding the Offset to the starting point of SFN0 and end at a point obtained by adding the Offset to the ending point of SFN2, the time domain positions of the 2-nd FFP start from a point obtained by adding the Offset to the starting point of SFN3 and end at a point obtained by adding the Offset to the ending point of SFN 5, and so on.

Figure 6:
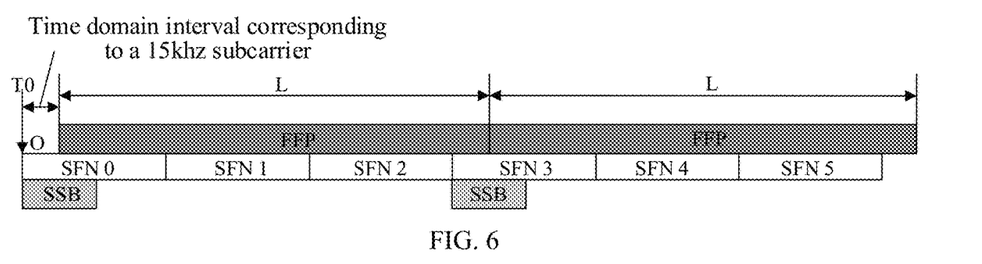
FIG. 6 is a schematic diagram showing time domain positions of yet another FFP according to an embodiment of the present disclosure.

FIG. 6 is a schematic diagram showing time domain positions of yet another FFP according to an embodiment of the present disclosure. As illustrated in FIG. 6, the starting point of T0=SFN0 is the reference position of the FFP, the specific offset O indicated by the first indication information is one multiplied by the time domain interval corresponding to the 15 khz subcarrier (i.e., 1 ms), and the second indication information indicates that the time domain length of the FFP is three times the SFN length. For example, the time domain length of the FFP is L=3×10 ms. The terminal can determine that the time domain positions of the 1-st FFP start from a point obtained by adding the Offset to the starting point of SFN0 and end at a point obtained by adding the Offset to the ending point of SFN2, the time domain positions of the 2-nd FFP start from a point obtained by adding the Offset to the starting point of SFN3 and end at a point obtained by adding the Offset to the ending point of SFN 5, and so on. FIG. 6 also illustrates positions of SSBs relative to SFNs.

Figure 7:
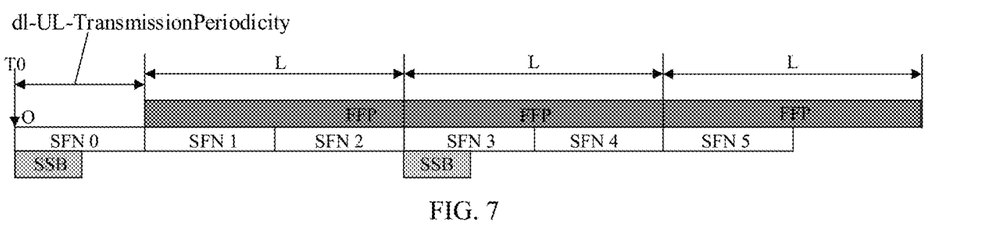
FIG. 7 is a schematic diagram showing time domain positions of still yet another FFP according to an embodiment of the present disclosure.

FIG. 7 is a schematic diagram showing time domain positions of still yet another FFP according to an embodiment of the present disclosure. As illustrated in FIG. 7, the starting point of T0=SFN0 is the reference position of the FFP, and the specific offset O indicated by the first indication information is dl-UL-TransmissionPeriodicity. That is, the network device can indicate the dl-UL-TransmissionPeriodicity. In this case, a relation between the dl-UL-TransmissionPeriodicity and the time domain length L of the FFP can be specified in a protocol. For example, the relation can be P=m×dl-UL-TransmissionPeriodicity. As an example, suppose that an indication value of the dl-UL-TransmissionPeriodicity is 10 ms, if m=2, then the time domain length L of the FFP is 20 ms. Here, m can be explicitly indicated by the network device, or can be a default fixed value. FIG. 7 also illustrates positions of SSBs relative to SFNs.

In FIGS. 4 to 7, SFN0, SFN1, SFN2, SFN3, SFN4 and SFN5 can represent an SFN with an index 0, an SFN with an index 1, an SFN with an index 2, an SFN with an index 3, an SFN with an index 4 and an SFN with an index 5, respectively.

Time domain positions of SSBs can be set at a starting position of SFN0, a starting position of SFN2, a starting position of SFN3, and a starting position of SFN5.

It should be understood that FIGS. 4 to 7 only illustrate schematic relative positions of SFNs, SSBs, and FFPs, and do not represent actual positions of the SFNs, the SSBs, and the FFPs. Positions of the SFNs, the SSBs, and the FFPs can be adjusted based on actual conditions. For example, the starting point or the starting position of SFN0 may represent a position corresponding to a 0-th symbol of SFN0, a starting point or a starting position of the 0-th subframe of SFN0, a position corresponding to another symbol of SFN0 other than the 0-th symbol, or a position corresponding to another subframe of SFN0 other than the 0-th subframe.

It should also be noted that FIGS. 4 to 7 only illustrate a case where the Offset is added to the starting point of the SFN. In other embodiments, there may be a case where the Offset is subtracted from the starting point of the SFN, and details thereof will be omitted here.

Figure 8:
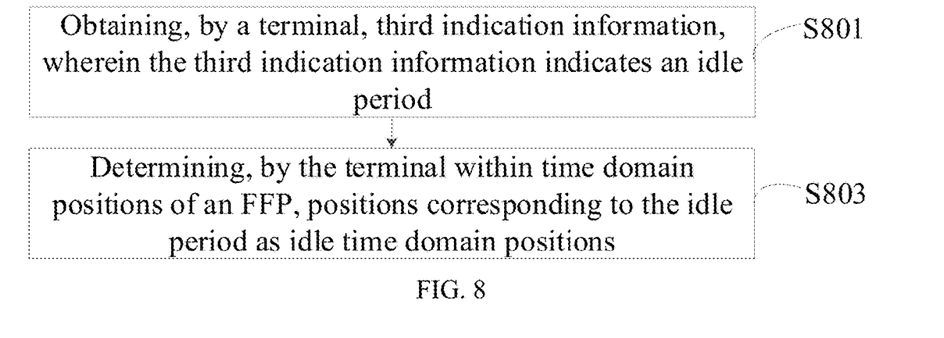
FIG. 8 is a schematic flowchart illustrating a time domain position determination method according to yet another embodiment of the present disclosure.

FIG. 8 is a schematic flowchart illustrating a time domain position determination method according to yet another embodiment of the present disclosure. As illustrated in FIG. 8, the time domain position determination method is applied in the terminal, and includes the following operations.

At block S801, a terminal obtains third indication information. The third indication information indicates an idle period.

The idle period can be a period of time. In an implementation, the idle period may be replaced by an idle time, an idle interval, or an idle duration. The idle period may be in units of symbols. For example, the idle period may be a period that occupies a certain number of symbols. In some implementations, the idle period may be understood as a reference IDLE period or a reference idle period.

In some embodiments, the third indication information may include the first information, the second information, the third information, or the fourth information in the above embodiments. In other embodiments, the terminal may receive fifth information transmitted by the network device, and the fifth information may include the third indication information. Therefore, the terminal can determine the idle period based on information transmitted by the network device.

For example, in some implementations, at least one of the first information, the second information, the third information, the fourth information, and the fifth information may be a configuration message, a reconfiguration message or the like.

At block S803, the terminal determines, within time domain positions of an FFP, positions corresponding to the idle period as idle time domain positions.

In some implementations, the terminal may determine the idle time domain positions based on the idle period and a Subcarrier Spacing (SCS). A manner for determining the idle time domain positions may be to determine idle symbols within the COT.

The time domain positions of the FFP can include COT time domain positions and idle time domain positions. The idle time domain positions can be a specific number of symbols in a time domain. The idle time domain positions can also be referred to as idle symbols or IDLE symbols.

The COT cannot be longer than 95% of the FFP, and there is an idle period immediately after the COT. The idle period lasts until the beginning of a next FFP, such that a length of the idle period is at least 5% of the FFP, and a minimum value of the length is 100 microseconds (µs). That is, in the embodiments of the present disclosure, a time length corresponding to the idle time domain positions should be greater than or equal to 5% of a time length corresponding to the time domain positions of the FFP.

In the implementations of the present disclosure, the idle period may be a consecutive period of time. In other implementations, the idle period may be a non-consecutive period of time. Within a time domain length of one FFP, a sub-time interval at a starting position and a sub-time interval at an ending position form an idle period.

The terminal transmits no uplink data to the network device within the idle time domain positions.

In the embodiments of the present disclosure, the terminal can determine the idle time domain positions based on the idle period indicated by the obtained third indication information, thereby providing a way to determine the idle time domain positions. Therefore, the terminal may perform listening based on the idle time domain positions.

On a basis of the time domain position determination method in the embodiment corresponding to FIG. 8, an embodiment of the present disclosure may further provide a time domain position determination method. The method is applied in the terminal.

In some implementations, the method may further include determining, by the terminal within the time domain positions of the FFP, positions other than the idle time domain positions as time domain positions corresponding to a COT. The time domain positions corresponding to the COT can be referred to as symbols within the COT.

In an implementation, the terminal can perform channel listening at the time domain positions corresponding to the COT.

In some implementations, determining, within the time domain positions of the FFP, the positions corresponding to the idle period as the idle time domain positions may include: projecting the idle period onto the time domain positions of the FFP; determining, within the time domain positions of the FFP, time domain positions overlapping the idle period as the idle time domain positions; and determining symbols in a current FFP other than idle symbols as symbols in the COT.

In some embodiments, projecting the idle period onto the time domain positions of the FFP may include projecting the idle period reversely from a last symbol of the time domain positions of the FFP.

For example, the time domain positions of the FFP include a 0-th symbol to an N-th symbol. When a length of an idle period is T symbols, the idle period of T symbols can be projected reversely from a last symbol of the time domain positions of the FFP, such that projection positions can be symbol positions between an (N-T)-th symbol and the N-th symbol, and then the terminal determines positions where the projection positions overlap the time domain positions of the FFP as the idle period. The idle period is an interval of symbols between the (N-T)-th symbol and the N-th symbol.

In the embodiments of the present disclosure, the idle period is projected onto the symbols in the FFP; symbols overlapping the idle period are determined as idle symbols; and symbols in the current FFP other than the idle symbols are determined as the symbols in the COT, thus providing a way to determine the idle symbols and the symbols in the COT. By projecting a length of a reference interval reversely from the last symbol of the FFP, the idle time domain positions are located at time domain ending positions of the time domain positions of the FFP.

A way to determine the idle period in the embodiments of the present disclosure will be described below.

In some embodiments, the idle period can be determined by adding a product of a fourth value and a third interval to an initial value. The fourth value is an integer greater than or equal to 1.

For example, the idle period and the third interval may satisfy: $I=m \times K+K0$. Here, I represents the idle period, K represents the third interval, K0 represents the initial value, and m is a positive integer.

The initial value K0 can be any value between 50 microseconds and 150 microseconds, or can be zero. The any value between 50 microseconds and 150 microseconds can be 50 microseconds, 80 microseconds, 100 microseconds, 120 microseconds, or 150 microseconds, etc., which is not limited by the present disclosure.

In some embodiments, the third interval includes any one of a time domain interval corresponding to a 15 khz subcarrier, a time domain interval corresponding to a 30 khz subcarrier, a time domain interval corresponding to a 60 khz subcarrier, a time domain interval corresponding to a 120 khz subcarrier, a time domain interval corresponding to a 240 khz subcarrier, and any value between 5 microseconds and 13 microseconds. The any value between 5 microseconds and 13 microseconds can be, for example, 5 microseconds, 7 microseconds, 9 microseconds, 11 microseconds, or 13 microseconds, etc., which is not limited by the present disclosure.

In some embodiments, the third interval and/or the initial value is obtained based on an explicit indication or an implicit indication by a network device; or the third interval is a third fixed value, and the initial value K0 is a fourth fixed value.

In the implementations of the present disclosure, a way to determine the idle period based on the third interval, or based on the third interval and the initial value, is provided, such that the terminal can determine the time domain positions corresponding to the COT based on the idle period, and can then perform the channel listening based on the idle period and/or the time domain positions corresponding to the COT.

The following takes time domain positions of one FFP as an example to describe the idle time domain positions and the time domain positions corresponding to the COT.

Figure 9:
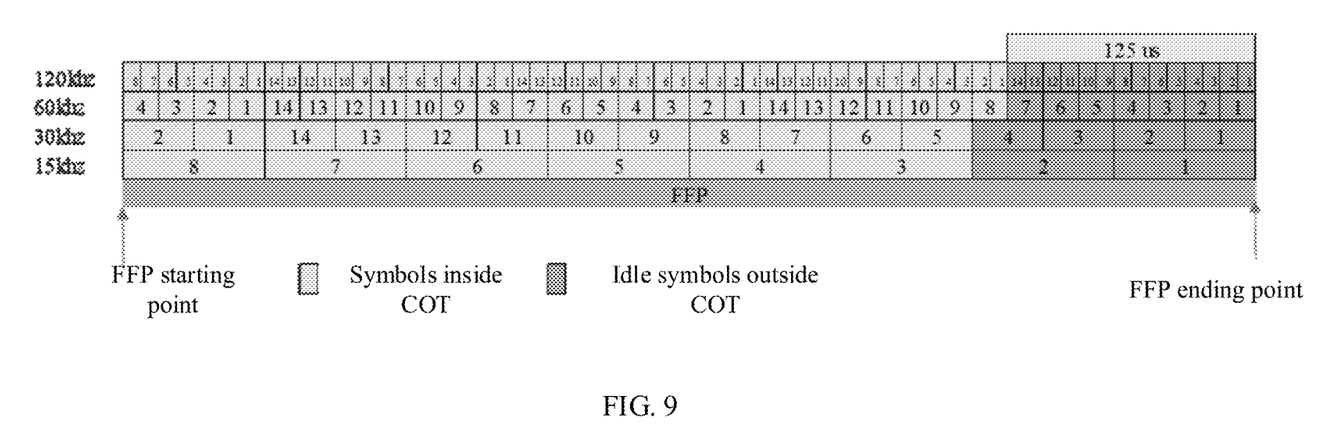
FIG. 9 is a schematic diagram illustrating idle time domain positions and time domain positions corresponding to a Channel Occupancy Time (COT) according to an embodiment of the present disclosure.

FIG. 9 is a schematic diagram illustrating idle time domain positions and time domain positions corresponding to a COT according to an embodiment of the present disclosure. As illustrated in FIG. 9, the terminal receives a length of an idle period transmitted by the network device which is 1×K. Here, M is equal to 1, and K0 is equal to 0. In some embodiments, K may be 125 us.

The terminal can project the idle period from a last symbol of the FFP onto symbols of the FFP. If a system SCS=15 khz and last two symbols of the FFP overlap the idle period, the terminal can determine that the last two symbols of the FFP are idle symbols.

If SCS=30 khz, the terminal can determine that last 4 symbols of the FFP are idle symbols; if SCS=60 khz, the terminal can determine that last 7 symbols of the FFP are idle symbols; and if SCS=120 khz, the terminal can determine that last 14 symbols of the FFP are idle symbols.

On the other hand, the terminal can determine that other symbols in the current FFP are all symbols in the COT.

Figure 10:
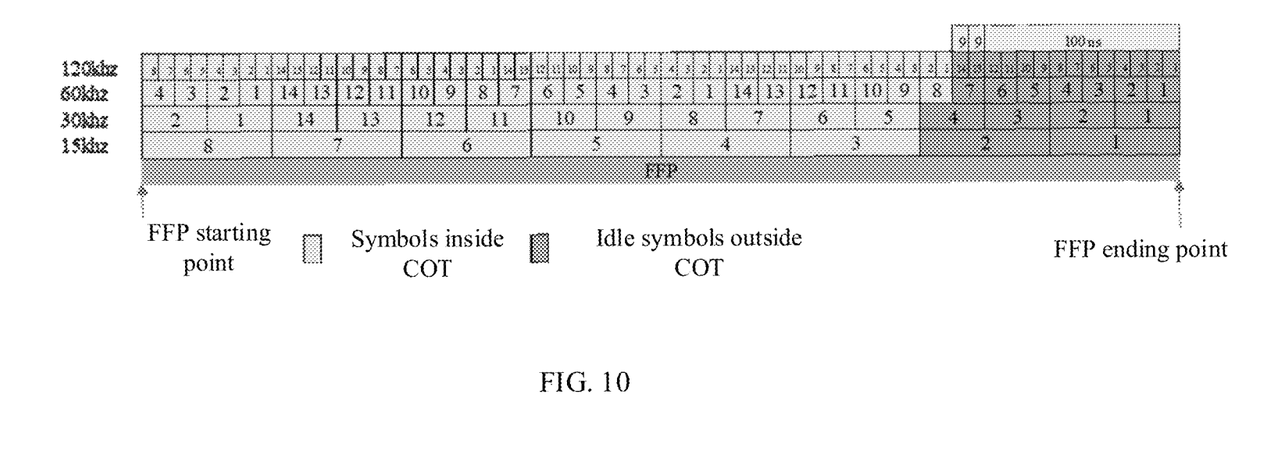
FIG. 10 is another schematic diagram illustrating idle time domain positions and time domain positions corresponding to a COT according to an embodiment of the present disclosure.

FIG. 10 is another schematic diagram illustrating idle time domain positions and time domain positions corresponding to a COT according to an embodiment of the present disclosure. As illustrated in FIG. 10, the terminal receives a length of an idle period transmitted by the network device which is 2×K+K0. Here, m is equal to 2, K=9 us, and K0=100 us.

The terminal can project the idle period from a last symbol of the FFP onto symbols of the FFP. If the system SCS=15 khz and last two symbols of the FFP overlap the idle period, the terminal can determine that the last two symbols of the FFP are idle symbols.

If SCS=30 khz, the terminal can determine that last 4 symbols of the FFP are idle symbols; if SCS=60 khz, the terminal can determine that last 7 symbols of the FFP are idle symbols; and if SCS=120 khz, the terminal can determine that last 14 symbols of the FFP are idle symbols.

On the other hand, the UE can determine that other symbols in the current FFP are all symbols in the COT.

It should also be noted that ways for determining the starting position of the FFP, the time domain length of the FFP, and the idle period in the embodiments of the present disclosure may be determined by a network device side.

On a basis of the above embodiments, an embodiment of the present disclosure provides a time domain position determination apparatus. Units included in the apparatus and modules included in each unit can be implemented by a processor in a terminal device, or of course can be implemented by a specific logic circuit. In an implementation, the processor can be a Central Processing Unit (CPU), a Microprocessor Unit (MPU), a Digital Signal Processor (DSP), a Field Programmable Gate Array (FPGA) or the like.

Figure 11:
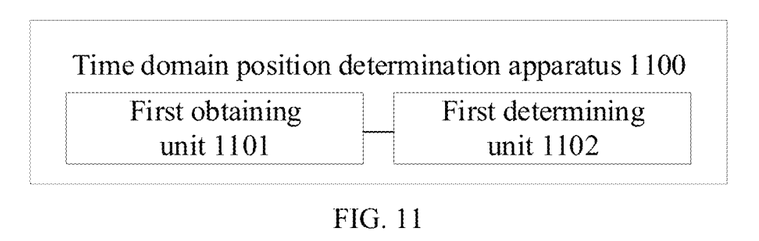
FIG. 11 is a schematic block diagram showing a structure of a time domain position determination apparatus according to an embodiment of the present disclosure.

FIG. 11 is a schematic block diagram showing a structure of a time domain position determination apparatus according to an embodiment of the present disclosure. As illustrated in FIG. 11, a time domain position determination apparatus 1100 includes a first obtaining unit 1101 and a first determining unit 1102.

The first obtaining unit 1101 is configured to obtain, by a terminal, first indication information and second indication information. The first indication information indicates a starting position of an FFP, and the second indication information indicates a time domain length of the FFP.

The first determining unit 1102 is configured to determine time domain positions of the FFP based on the starting position of the FFP and the time domain length of the FFP.

In some embodiments, the first obtaining unit 1101 is configured to: receive, by the terminal, first information transmitted by a network device, the first information including the first indication information and the second indication information, or to receive, by the terminal, second information transmitted by the network device, the second information including the first indication information, and receive, by the terminal, third information transmitted by the network device, the third information including the second indication information.

In some embodiments, the first determining unit 1102 is configured to: determine a first product of (q−1) and the time domain length of the FFP, where q is an integer greater than or equal to 1; determine a first sum value of the starting position of the FFP and the first product; determine a second product of q and the time domain length of the FFP; determine a second sum value of the starting position of the FFP and the second product; and determine positions between the first sum value and the second sum value in a time domain as time domain positions of a q-th FFP.

In some embodiments, the starting position of the FFP includes a specific offset relative to a reference position. The first determining unit 1102 is configured to obtain the reference position, and determine the time domain positions of the FFP based on the specific offset, the time domain length of the FFP, and the reference position.

In some embodiments, the first determining unit 1102 is configured to: obtain, by the terminal, a reference position, and determining a specific offset based on the reference position and the starting position of the FFP; and determine the time domain positions of the FFP based on the specific offset, the time domain length of the FFP, and the reference position.

In some embodiments, the first determining unit 1102 is configured to: determine a first product of (q−1) and the time domain length of the FFP, where q is an integer greater than or equal to 1; determine a third sum value of the reference position, the specific offset, and the first product; determine a second product of q and the time domain length of the FFP; determine a fourth sum value of the reference position, the specific offset, and the second product; and determine positions between the third sum value and the fourth sum value in a time domain as time domain positions of a q-th FFP.

In some embodiments, the starting position of the FFP is determined by offsetting a specific offset from the reference position in the time domain.

In some embodiments, the specific offset is obtained by multiplying a first interval by a first value, the first value being an integer greater than or equal to 0; or the specific offset is obtained by dividing the first interval by a second value, the second value being an integer greater than or equal to 1.

In some embodiments, the specific offset is a product of the first interval and the first value; or the specific offset is a result of dividing the first interval by the second value.

In some embodiments, the first interval includes one of a time domain interval corresponding to an SFN, a time domain interval corresponding to a 15 khz subcarrier, a time domain interval corresponding to a 30 khz subcarrier, a time domain interval corresponding to a 60 khz subcarrier, a time domain interval corresponding to a 120 khz subcarrier, a time domain interval corresponding to a 240 khz subcarrier, and a time domain interval corresponding to an SSB.

In some embodiments, the first interval is obtained based on an explicit indication or an implicit indication by a network device, or the first interval is a first fixed value.

In some embodiments, the time domain length of the FFP is determined based on a product of a third value and a second interval, the third value being an integer greater than or equal to 1.

In some embodiments, the time domain length of the FFP is the product of the third value and the second interval.

In some embodiments, the second interval includes one of a time interval corresponding to an SFN, a time interval corresponding to a 15 khz subcarrier, a time interval corresponding to a 30 khz subcarrier, a time interval corresponding to a 60 khz subcarrier, a time interval corresponding to a 120 khz subcarrier, a time interval corresponding to a 240 khz subcarrier, and a configuration periodicity.

In some embodiments, the second interval is obtained based on an explicit indication or an implicit indication by a network device, or the second interval is a second fixed value.

In some embodiments, a starting position of an SFN with an index of a specific value, or the reference position is a starting position of an SFN with an index of a specific value indicated by the network device. The specific value is an integer greater than or equal to 0.

Figure 12:
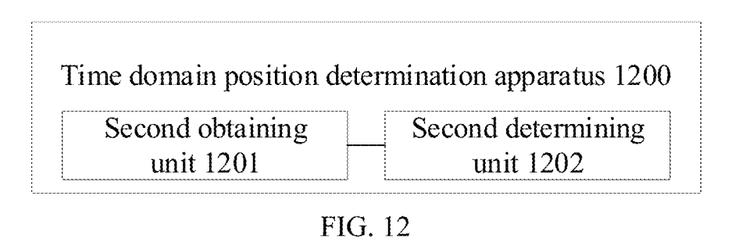
FIG. 12 is a schematic block diagram showing a structure of another time domain position determination apparatus according to an embodiment of the present disclosure.

FIG. 12 is a schematic block diagram showing a structure of another time domain position determination apparatus according to an embodiment of the present disclosure. As illustrated in FIG. 12, a time domain position determination apparatus 1200 includes a second obtaining unit 1201 and a second determining unit 1202.

The second obtaining unit 1201 is configured to obtain, by a terminal, third indication information. The third indication information indicates an idle period.

The second determining unit 1202 is configured to determine, within time domain positions of an FFP, positions corresponding to the idle period as idle time domain positions.

In some embodiments, the second determining unit 1202 is configured to determine, within the time domain positions of the FFP, the idle time domain positions based on the idle period and an SCS.

In some embodiments, the second determining unit 1202 is further configured to determine, within the time domain positions of the FFP, positions other than the idle time domain positions as time domain positions corresponding to a COT.

In some embodiments, the second determining unit 1202 is configured to: project the idle period onto the time domain positions of the FFP; and determine, within the time domain positions of the FFP, time domain positions overlapping the idle period as the idle time domain positions.

In some embodiments, the second determining unit 1202 is configured to project the idle period reversely from a last symbol of the time domain positions of the FFP.

In some embodiments, the idle period is determined by adding a product of a fourth value and a third interval to an initial value, the fourth value being an integer greater than or equal to 1.

In some embodiments, the third interval includes one of a time domain interval corresponding to a 15 khz subcarrier, a time domain interval corresponding to a 30 khz subcarrier, a time domain interval corresponding to a 60 khz subcarrier, a time domain interval corresponding to a 120 khz subcarrier, a time domain interval corresponding to a 240 khz subcarrier, and any value between 5 microseconds and 13 microseconds.

In some embodiments, the initial value is any value between 50 microseconds and 150 microseconds, or is 0.

In some embodiments, the third interval and/or the initial value is obtained based on an explicit indication or an implicit indication by a network device; or the third interval is a third fixed value, and the initial value is a fourth fixed value.

The description of the above apparatus embodiments is similar to the description of the above method embodiments, and the above apparatus embodiments have similar advantageous effects to the above method embodiments. Technical details not disclosed in the apparatus embodiments of the present disclosure, reference could be understood by referring to the description of the method embodiments of the present disclosure.

It should be noted that in the embodiments of the present disclosure, when the time domain position determination method as described above is implemented in the form of software functional module(s) and sold or used as a stand-alone product, it can also be stored in a computer-readable storage medium. Based on this understanding, the technical solutions according to the present disclosure essentially (in other words, the part thereof that contributes to the related art) can be embodied in the form of a software product. The computer software product may be stored in a storage medium and contain instructions to enable a terminal to perform all or part of the method described in each of the embodiments of the present disclosure. The storage medium may include various mediums capable of storing program codes, such as a Universal Serial Bus flash drive, a mobile hard disk, a Read-Only Memory (ROM), a magnetic disk, or an optical disc. In this way, the embodiments of the present disclosure are not limited to any specific combination of hardware and software.

Figure 13:
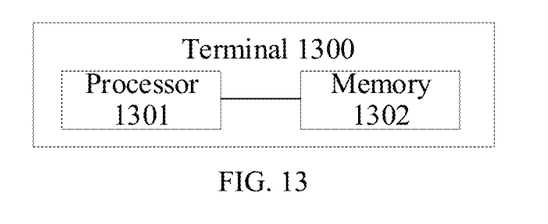
FIG. 13 is a schematic block diagram showing a structure of a terminal according to an embodiment of the present disclosure.

FIG. 13 is a schematic block diagram showing a structure of a terminal according to an embodiment of the present disclosure. As illustrated in FIG. 13, the terminal 140 or the terminal 160 illustrated in FIG. 1 may be configured as a user terminal 1300. The terminal 1300 includes a processor 1301 and a memory 1302. The processor is communicatively coupled with the memory.

The memory 1302 stores instructions. The instructions, when executed by the processor, cause the terminal to perform the method for determining the time domain positions of the FFP described in any of the above embodiments. For example, the method may include: obtaining, by a terminal, first indication information and second indication information, the first indication information indicating a starting position of an FFP, the second indication information indicating a time domain length of the FFP; and determining time domain positions of the FFP based on the starting position of the FFP and the time domain length of the FFP.

The memory 1302 stores instructions. The instructions, when executed by the processor, cause the terminal to perform the method for determining the idle time domain positions described in any of the above embodiments. For example, the method may include: obtaining, by a terminal, third indication information, the third indication information indicating an idle period; and determining, within time domain positions of an FFP, positions corresponding to the idle period as idle time domain positions.

In other embodiments of the present disclosure, the terminal may also include one or more of a memory (not illustrated in the figure), an Input/Output (I/O) interface (not illustrated in the figure), and a communication unit (not illustrated in the figure) for performing the time domain position determination method described in each of the above embodiments. In the embodiments of the present disclosure, these elements can be configured to transfer data and transmit or receive instructions between each other.

The processor 1301 includes any suitable type of general-purpose or special-purpose microprocessor, digital signal processor, or microcontroller. The memory and/or storage 1302 may be configured in a manner as described above for the memory and/or the storage. The memory and/or the storage 1302 may also be configured to store information and data used by the processor 1301.

The I/O interface can be configured to facilitate communication between the terminal 1300 and other apparatuses. For example, the I/O interface may receive signals for the terminal 1300 from another apparatus (for example, a computer) including system configuration information. The I/O interface can also output data of test statistics to other apparatuses.

The communication unit may include one or more cellular communication modules, which include, for example, a 5G radio system communication module, an LTE communication module, a High-Speed Packet Access (HSPA) communication module, a Wideband Code Division Multiple Access (WCDMA) communication module, and/or a Global System for Mobile Communications (GSM) communication module.

An embodiment of the present disclosure provides a computer-readable storage medium. The computer-readable medium stores instructions. The instructions are executed by one or more processors of a terminal to perform operations of the time domain position determination method according to any of the above embodiments.

The computer-readable medium may include a volatile or nonvolatile, magnetic, semiconductor, tape-type, optical, removable, non-removable, or other type of computer-readable medium or computer-readable storage device. For example, as disclosed, the computer-readable medium may be a storage device or a memory module storing computer instructions. In some embodiments, the computer-readable medium may be an optical disc or a flash drive storing computer instructions.

Figure 14:
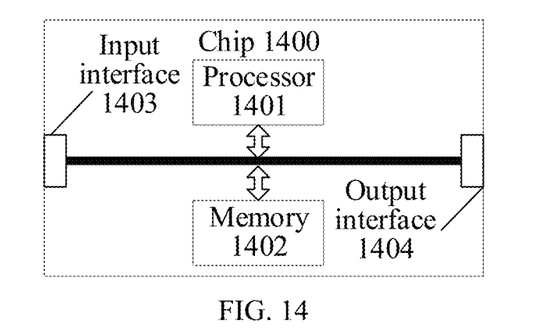
FIG. 14 is a schematic block diagram showing a structure of a chip according to an embodiment of the present disclosure.

FIG. 14 is a schematic block diagram showing a structure of a chip according to an embodiment of the present disclosure. A chip 1400 illustrated in FIG. 14 includes a processor 1401. The processor 1401 can invoke and run a computer program from a memory to perform operations of the method, which is performed by a terminal, according to any of the embodiments of the present disclosure.

In some embodiments, as illustrated in FIG. 14, the chip 1400 may further include a memory 1402. Here, the processor 1401 may invoke and run a computer program from the memory 1402 to perform operations of the method, which is performed by the terminal, according to any of the embodiments of the present disclosure.

Here, the memory 1402 may be a separate component independent of the processor 1401, or may be integrated in the processor 1401.

In some embodiments, the chip 1400 may further include an input interface 1403. Here, the processor 1401 can control the input interface 1403 to communicate with other devices or chips, specifically, to obtain information or data transmitted by other devices or chips.

In some embodiments, the chip 1400 may further include an output interface 1404. Here, the processor 1401 can control the output interface 1404 to communicate with other devices or chips, specifically, to output information or data to other devices or chips.

In some embodiments, the chip can be applied to the network device in the embodiment of the present disclosure. In addition, the chip can implement corresponding procedures implemented by the network device in the method according to any of the embodiments of the present disclosure. For brevity, details thereof will be omitted herein.

In some embodiments, the chip can be applied to the terminal in the embodiment of the present disclosure. The chip can implement corresponding procedures implemented by the terminal in the method according to any of the embodiments of the present disclosure. For brevity, details thereof will be omitted herein.

It should be understood that the chip mentioned in the embodiments of the present disclosure may also be referred to as a system-level chip, a system-chip, a chip system, or a system-on-chip.

An embodiment of the present disclosure provides a computer program product. The computer program product includes a computer storage medium. The computer storage medium stores computer program codes. The computer program codes include instructions executable by at least one processor. The instructions, when executed by the at least one processor, perform the operations of any of the above-described methods which is implemented by the terminal.

In some embodiments, the computer program product can be applied to the terminal in the embodiments of the present disclosure, and the computer program instructions cause the computer to execute corresponding procedures implemented by the terminal in the method according to any of the embodiments of the present disclosure. For brevity, details thereof will be omitted herein.

It is to be noted that the processor in the embodiments of the present disclosure may be an integrated circuit chip with signal processing capability. In an implementation, the operations of the above method embodiments can be implemented by hardware integrated logic circuits in a processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, operations, and logical block diagrams disclosed in the embodiments of the present disclosure can be implemented or performed. The general purpose processor may be a microprocessor or any conventional processor. The operations of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, electrically erasable programmable memory, or register. The storage medium can be located in the memory, and the processor can read information from the memory and perform the operations of the above methods in combination with its hardware.

It can be appreciated that the memory, the medium, the computer-readable medium, the storage medium, or the computer storage medium in the embodiments of the present disclosure may be a volatile memory or a non-volatile memory, or may include both volatile and non-volatile memories. Here, the non-volatile memory may be an ROM, a Programmable ROM (PROM), an Erasable PROM (EPROM), an Electrically EPROM (EEPROM), or a flash memory. The volatile memory may be a Random Access Memory (RAM), which is used as an external cache. By way of illustration rather than limitation, many forms of RAMs are available, including for example Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DR RAM). It is to be noted that the memory used for the system and method described in the present disclosure is intended to include, but is not limited to, these and any other suitable types of memories. At least one of the memory, the medium, the computer-readable medium, the storage medium, and the computer storage medium may be the same component.

It can be appreciated that the above memories, mediums, computer-readable mediums, storage mediums, or computer storage mediums are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), a Direct Rambus RAM (DR RAM) or the like. That is, the memory in the embodiments of the present disclosure is intended to include, but is not limited to, these and any other suitable types of memories.

It is to be noted that the description of the above embodiments of the storage medium, the computer program, the chip, and the computer program product is similar to the description of the above method embodiments, and the above embodiments of the storage medium, the computer program, the chip, and the computer program product have similar advantageous effects to the method embodiments. Technical details not disclosed in the embodiments of the storage medium and device of the present disclosure could be understood by referring to the description of the method embodiments of the present disclosure.

It can be appreciated that "one embodiment/implementation", "an embodiment/implementation", "an embodiment/implementation of the present disclosure", "the above embodiment/implementation", or "some embodiments/implementations" mentioned throughout the present disclosure means that a specific feature, structure, or characteristic related to the embodiment is included in at least one embodiment of the present disclosure. Therefore, the "one embodiment/implementation", "an embodiment/implementation", "an embodiment/implementation of the present disclosure", "the above embodiment/implementation", or "some embodiments/implementations" appearing throughout the present disclosure does not necessarily refer to the same embodiment. In addition, these specific features, structures or characteristics can be combined in one or more embodiments in any suitable manner. It can be appreciated that, in various embodiments of the present disclosure, a numerical value of a sequence number of each procedure does not mean an execution sequence. The execution sequence of each procedure should be determined by a function and internal logic of the procedure, and the numerical value should not constitute any limitation to an implementation of the embodiments of the present disclosure. Serial numbers of the above embodiments of the present disclosure are for description only, and do not represent preference of the embodiments.

Without specific description, executing any operation in the embodiments of the present disclosure by the terminal may refer to executing the operation by a processor in the terminal. The embodiments of the present disclosure do not limit a sequence in which the terminal executes the described operations, unless otherwise specified. In addition, methods used to process data in different embodiments may be the same method or different methods. It is also to be noted that any operation in the embodiments of the present disclosure can be independently executed by the terminal. That is, when the terminal executes any of the operations in the embodiments, it may not rely on the execution of other operations.

In the embodiments of the present disclosure, it can be appreciated that the disclosed terminals and methods may be implemented in other ways. For example, the terminal embodiments described above are illustrative only. For example, the divisions of the units are only divisions based on logical functions, and there may be other divisions in actual implementations. For example, more than one unit or component may be combined or integrated into another system, or some features can be ignored or not performed. In addition, the mutual coupling or direct coupling or communicative connection between components as shown or discussed may be indirect coupling or communicative connection between terminals or units via some interfaces which may be electrical, mechanical, or in any other forms.

The methods disclosed in the method embodiments of the present disclosure can be combined arbitrarily to obtain a new method embodiment if no conflict is incurred.

The features disclosed in the product embodiments of the present disclosure can be combined arbitrarily to obtain a new product embodiment if no conflict is incurred.

The features disclosed in the method embodiments or the terminal embodiments of the present disclosure can be combined arbitrarily to obtain a new method embodiment or a new terminal embodiment if no conflict is incurred.

Those skilled in the art can understand that all or part of the operations in the above method embodiments can be implemented by relevant hardware instructed by a program. The program can be stored in a computer-readable storage medium. The program, when executed, performs operations including the above method embodiments. The storage medium includes a mobile storage terminal, an ROM, a magnetic disk, an optical disc, or other media that can store program codes.

Alternatively, when the above integrated unit is implemented in the form of software functional unit(s) and sold or used as a standalone product, it can be stored in a computer-readable storage medium. Based on this understanding, the technical solutions according to the present disclosure essentially (in other words, the part thereof that contributes to the related art) can be embodied in the form of a software product. The computer software product may be stored in a storage medium and contain instructions to enable the terminal to perform all or part of the method described in each of the embodiments of the present disclosure. The storage medium may include various mediums capable of storing program codes, such as a mobile storage terminal, an ROM, a magnetic disk, or an optical disc.

In the embodiments of the present disclosure, for descriptions of the same operation and the same content in different embodiments, reference may be made to each other. In the embodiments of the present disclosure, the term "and" does not affect a sequence of operations. For example, the terminal executing A and B may mean that the terminal executes A first and then executes B, the terminal executes B first and then executes A, or the terminal executes A and executes B simultaneously.

It should be understood that in the present disclosure, when one message includes A, it means that the message contains A, the message indicates A, or the message includes an identifier of A such that A can be obtained based on the identifier of A. It should be understood that when different terminals execute the same operation, the operation may be executed in the same manner.

While the embodiments of the present disclosure have been described above, the protection scope of the present disclosure is not limited to these embodiments. Various variants and alternatives can be easily conceived by any of those skilled in the art without departing from the technical scope of the present disclosure. Therefore, these variants and alternatives are to be encompassed by the protection scope of the present disclosure as defined by the claims as attached.

It should be understood that the present disclosure is not limited to the precise structure that has been described above and illustrated in the drawings. Various modifications and changes can be made without departing from the scope of the present disclosure, which is only limited by the claims as attached.

INDUSTRIAL APPLICABILITY

The embodiments of the present disclosure provide a time domain position determination method and apparatus, a terminal, a computer-readable medium, a chip, and a computer program product. By adopting the solution of the time domain position determination method in the present disclosure, the terminal can determine the time domain positions of the FFP based on the starting position of the FFP and the time domain length of the FFP, thereby providing a way to determine the time domain positions of the FFP.

What is claimed is:

1. A time domain position determination method, the method being applied in a Frame Based Equipment (FBE) access mode and comprising:
obtaining, by a terminal, first indication information and second indication information, wherein the first indication information indicates a starting position of a Fixed Frame Period (FFP), and the second indication information indicates a time domain length of the FFP; and
determining time domain positions of the FFP based on the starting position of the FFP and the time domain length of the FFP, wherein said determining the time domain positions of the FFP based on the starting position of the FFP and the time domain length of the FFP comprises:
obtaining, by the terminal, a reference position, wherein the reference position is a starting position of a System Frame Number (SFN) with an index 2; and
determining the time domain positions of the FFP based on a specific offset, the time domain length of the FFP, and the reference position, wherein the starting position of the FFP comprises the specific offset relative to the reference position;
wherein
the specific offset is obtained by multiplying a first time domain interval by a first value, the first value being an integer greater than or equal to 0; or
the specific offset is obtained by dividing the first time domain interval by a second value, the second value being an integer greater than or equal to 1.

2. The method according to claim 1, wherein said determining the time domain positions of the FFP based on the specific offset, the time domain length of the FFP, and the reference position comprises:
determining a first product of (q-1) and the time domain length of the FFP, where q is an integer greater than or equal to 1;
determining a first sum value of the reference position, the specific offset, and the first product;
determining a second product of q and the time domain length of the FFP;
determining a second sum value of the reference position, the specific offset, and the second product; and
determining positions between the first sum value and the second sum value in a time domain as time domain positions of a q-th FFP.

3. The method according to claim 1, wherein the specific offset is a product of the first time domain interval and the first value; or the specific offset is a result of dividing the first time domain interval by the second value.

4. The method according to claim 1, wherein the first time domain interval comprises one of:
a time domain interval corresponding to a System Frame Number (SFN);
a time domain interval corresponding to a 15 khz subcarrier;
a time domain interval corresponding to a 30 khz subcarrier;
a time domain interval corresponding to a 60 khz subcarrier;
a time domain interval corresponding to a 120 khz subcarrier;
a time domain interval corresponding to a 240 khz subcarrier; and
a time domain interval corresponding to a Synchronization Signal and physical broadcast channel Block (SSB).

5. The method according to claim 1, wherein the first time domain interval is obtained based on an explicit indication, an implicit indication, or a configuration indication by a network device, or the first time domain interval is a first fixed value.

6. The method according to claim 1, wherein the time domain length of the FFP is calculated according to an equation $P=m \times L$, where P represents the time length of the FFP, L represents a time interval and m is a positive integer.

7. A terminal, the terminal being applied in a Frame Based Equipment (FBE) access mode and comprising:
a memory storing instructions; and
a processor communicatively coupled with the memory, wherein the instructions, when executed by the processor, cause the terminal to:
obtain first indication information and second indication information, wherein the first indication information indicates a starting position of a Fixed Frame Period (FFP), and the second indication information indicates a time domain length of the FFP; and determine time domain positions of the FFP based on the starting position of the FFP and the time domain length of the FFP, wherein for determining the time domain positions of the FFP based on the starting position of the FFP and the time domain length of the FFP, the terminal is configured to:

obtain a reference position, wherein the reference position is a starting position of a System Frame Number (SFN) with an index 2; and determine the time domain positions of the FFP based on a specific offset, the time domain length of the FFP, and the reference position, wherein the starting position of the FFP comprises the specific offset relative to the reference position; wherein the specific offset is obtained by multiplying a first time domain interval by a first value, the first value being an integer greater than or equal to 0; or the specific offset is obtained by dividing the first time domain interval by a second value, the second value being an integer greater than or equal to 1.

8. The terminal according to claim 7, wherein said determining the time domain positions of the FFP based on the specific offset, the time domain length of the FFP, and the reference position comprises:

determining a first product of (q−1) and the time domain length of the FFP, where q is an integer greater than or equal to 1;

determining a first sum value of the reference position, the specific offset, and the first product;

determining a second product of q and the time domain length of the FFP;

determining a second sum value of the reference position, the specific offset, and the second product; and determining positions between the first sum value and the second sum value in a time domain as time domain positions of a q-th FFP.

9. The terminal according to claim 7, wherein the specific offset is a product of the first time domain interval and the first value; or the specific offset is a result of dividing the first time domain interval by the second value.

10. The terminal according to claim 7, wherein the first time domain interval comprises one of:

a time domain interval corresponding to a System Frame Number (SFN);

a time domain interval corresponding to a 15 khz subcarrier;

a time domain interval corresponding to a 30 khz subcarrier;

a time domain interval corresponding to a 60 khz subcarrier;

a time domain interval corresponding to a 120 khz subcarrier;

a time domain interval corresponding to a 240 khz subcarrier; and a time domain interval corresponding to a Synchronization Signal and physical broadcast channel Block (SSB).

11. The terminal according to claim 7, wherein the first time domain interval is obtained based on an explicit indication, an implicit indication, or a configuration indication by a network device, or the first time domain interval is a first fixed value.

12. The terminal according to claim 7, wherein the time domain length of the FFP is calculated according to an equation $P = m \times L$, where P represents the time length of the FFP, L represents a time interval and m is a positive integer.

* * * * *